United States Patent
Custodero et al.

(10) Patent No.: US 6,747,087 B2
(45) Date of Patent: Jun. 8, 2004

(54) RUBBER COMPOSITION FOR A TIRE, BASED ON DIENE ELASTOMER AND A REINFORCING TITANIUM OXIDE

(75) Inventors: Emmanuel Custodero, Chamalières (FR); Laure Simonot, Clermont-Ferrand (FR); Jean-Claude Tardivat, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 148 days.

(21) Appl. No.: 09/770,411

(22) Filed: Jan. 26, 2001

(65) Prior Publication Data

US 2002/0004549 A1 Jan. 10, 2002

Related U.S. Application Data

(63) Continuation of application No. PCT/EP00/04681, filed on May 23, 2000.

(30) Foreign Application Priority Data

May 28, 1999 (FR) ............................................. 99 06853

(51) Int. Cl.$^7$ ................................................. C08K 3/22
(52) U.S. Cl. .................... 524/497; 152/151; 152/209.1; 152/905
(58) Field of Search ................................ 524/497, 571, 524/572, 575; 152/151, 209.1, 905; 264/501; 523/150, 152

(56) References Cited

U.S. PATENT DOCUMENTS

| | | | |
|---|---|---|---|
| 3,842,111 A | 10/1974 | Meyer-Simon et al. | 260/448.2 |
| 3,873,489 A | 3/1975 | Thurn et al. | 260/33.6 AQ |
| 3,978,103 A | 8/1976 | Meyer-Simon et al. | 260/448.8 R |
| 3,997,581 A | 12/1976 | Pletka et al. | 260/448.8 R |
| 4,002,594 A | 1/1977 | Fetterman | 260/42.37 |
| 4,987,192 A * | 1/1991 | Oberster et al. | |
| 5,580,919 A | 12/1996 | Agostini et al. | 524/430 |
| 5,583,245 A | 12/1996 | Parker et al. | 556/427 |
| 5,663,396 A | 9/1997 | Musleve et al. | 556/427 |
| 5,684,171 A | 11/1997 | Wideman et al. | 556/427 |
| 5,684,172 A | 11/1997 | Wideman et al. | 556/427 |
| 5,696,197 A | 12/1997 | Smith et al. | 524/495 |

FOREIGN PATENT DOCUMENTS

| | | |
|---|---|---|
| CA | 2054059 | 10/1992 |
| CA | 2058901 | 3/1993 |
| CA | 2228692 | 1/1998 |
| EP | 0501227 | 9/1992 |
| EP | 0697432 | 2/1996 |

(List continued on next page.)

Primary Examiner—Patrick D. Niland
(74) Attorney, Agent, or Firm—Baker Botts L.L.P.

(57) ABSTRACT

The invention provides rubber composition usable for the manufacture of tires, comprising at least (i) one diene elastomer, (ii) one white filler as reinforcing filler and (iii) one coupling agent (white filler/elastomer), the white filler comprising a titanium oxide having the following characteristics:

(a) its specific BET surface area is between 20 and 200 m$^2$/g;

(b) its average particle size (by mass), $d_w$, is between 20 and 400 nm; and (c) its disagglomeration rate, $\alpha$, measured by the ultrasound disagglomeration test, at 100% power of a 600-watt ultrasonic probe, is greater than $2 \times 10^2$ $\mu$m$^1$/s.

The invention also provides for the use of a rubber composition according to the invention for the manufacture of rubber articles, in particular tires or semi-finished rubber products intended for these tires. The composition of the invention is particularly useful for the manufacture of colored tires or colored semi-finished articles such as tire treads or sidewalls.

25 Claims, 3 Drawing Sheets

FOREIGN PATENT DOCUMENTS

| | | |
|---|---|---|
| EP | 0810258 | 12/1997 |
| GB | 653814 | * 12/1947 |
| GB | 653814 | 5/1951 |
| GB | 836716 | 6/1960 |
| GB | 2361219 A | * 10/2001 |
| JP | 3006247 | 1/1991 |
| JP | 7149950 | 6/1995 |
| JP | 8059894 | 3/1996 |
| WO | 9902590 | 1/1999 |
| WO | 9906480 | 2/1999 |
| WO | 9928376 | 6/1999 |
| WO | 0073372 | 12/2000 |

* cited by examiner

RUBBER COMPOSITION FOR A TIRE, BASED ON DIENE ELASTOMER AND A REINFORCING TITANIUM OXIDE

BACKGROUND OF THE INVENTION

This application is a continuation of PCT Application PCT/EP00/04681, filed May 23, 2000, now WO 00/73372.

The present invention relates to diene rubber compositions usable for the manufacture of tires or semi-finished products for tires, in particular treads for tires, and to reinforcing fillers capable of reinforcing such rubber compositions.

In order to reduce fuel consumption and pollution emitted by motor vehicles, major attempts have been made by tire designers to obtain tires having all of the following characteristics: very low rolling resistance, improved grip, both on dry ground and on wet or snow-covered ground, and very good wear resistance.

Numerous solutions have been proposed to lower the rolling resistance and to improve the grip of tires, but these generally result in a very great decline in wear resistance. It is known that the incorporation of conventional white fillers such as conventional silicas or aluminas, chalk, talc, titanium oxides, clays such as bentonite or kaolin in rubber compositions used in the manufacture of tires, in particular treads, results in a reduction in the rolling resistance and an improvement in grip to wet, snow-covered or icy ground. However, such compositions also result in an unacceptable decline in wear resistance, because such conventional white fillers do not have a sufficient reinforcement ability in such rubber compositions. Thus, these white fillers are generally referred to as non-reinforcing fillers or, alternatively, inert fillers.

One solution to this problem was described in Patent Application EP-A-0 501 227, which discloses a diene rubber composition reinforced by a special precipitated silica ($SiO_2$) which allows manufacture of a tire having substantially improved rolling resistance, without adversely affecting the other properties, particularly grip, endurance and wear resistance. European Patent Application EP-A-0 810 258 discloses a diene rubber composition reinforced by another special white filler, a specific alumina ($Al_2O_3$) of high dispersibility, which allows production of tires or treads having an excellent compromise of contradictory properties.

Because of these new white fillers, referred to as reinforcing fillers, it has also been possible to begin commercializing colored tires, in particular, those with colored treads. For aesthetic reasons, the ability to produce such tires meets a real expectation of users, in particular for passenger vehicles while, at the same time providing a substantial saving in terms of fuel.

Applications WO99/02590 and WO99/06480 disclose rubber compositions, based on reinforcing silicas or aluminas, used for manufacturing tires having treads or sidewalls of different colors. One or more inert fillers (i.e., non-reinforcing ones), such as kaolin, talc or titanium oxide, that function as a pigment or pastelizing agent are used as complementary white fillers in these compositions.

Among inert fillers, titanium oxides, in particular, are well-known as white pigments in different matrices such as paints, inks, cosmetics, plastics materials and polymers, such as rubber compositions intended to be incorporated in tire sidewalls (cf. for example CA-A-2054059, CA-A-2058901, CA-A-2228692, GB-A-836716, EP-A-697432, and applications JP1991/006247, JP1995/149950 and JP1996/059894).

In addition to their pigmentation or pastelizing properties, titanium oxides also are effective anti-UV agents, that can provide beneficial anti-aging protection of colored rubber compositions. Such compositions are normally devoid of carbon black (which is an excellent UV absorber) and thus are sensitive to the degrading action of sunlight (see applications WO99/02590 and WO99/06480 referred to above). Moreover, they cannot be protected by antioxidants (paraphenylenediamine type) conventionally used in black tires, because of the staining effect of these antioxidants.

During the course of research, the inventors have found that there are special titanium oxides which may be used, not only as anti-aging or pigmentation agents, but as true reinforcing fillers capable of replacing conventional carbon blacks in rubber compositions for tires. These titanium oxides unexpectedly represent an advantageous alternative to the use of reinforcing silicas or aluminas, in rubber compositions, particularly colored rubber compositions. In other words, compositions can comprise a single filler, a titanium oxide, which has several functions (reinforcement, pigmentation, anti-aging), instead of several fillers having single functions.

The rubber compositions reinforced with these special titanium oxides, hereinafter referred to as reinforcing titanium oxides, not only have better hysteresis and grip properties than those of conventional compositions filled with carbon black, but also have significantly improve wear resistance compared to those compositions of the prior art filled with conventional non-reinforcing titanium oxides.

SUMMARY OF THE INVENTION

The invention relates to a rubber composition usable for the manufacture of tires, comprising, as base constituents, (i) one or more diene elastomer(s), (ii) a white filler as reinforcing filler and (iii) a coupling agent (white filler/elastomer) linking the reinforcing filler and the elastomer, wherein the white filler comprises a titanium oxide having the following characteristics:

(a) its specific BET surface area is between 20 and 200 $m^2/g$;

(b) its average particle size (by mass), $d_w$, is between 20 and 400 nm; and (c) its disagglomeration rate, $\alpha$, measured by the ultrasound disagglomeration test, at 100% power of a 600-watt ultrasonic probe, is greater than $2 \times 10^{-2}$ $\mu m^{-1}/s$.

The prior art neither describes nor suggests the titanium oxide as described above in a rubber composition as reinforcing filler. As noted, the above titanium oxide is referred to as a "reinforcing titanium oxide", which, without anything other than an intermediate coupling agent (white filler/elastomer) can reinforce rubber compositions usable for the manufacture of tires, in particular treads of tires, having a high wear resistance. In particular, the prior art, e.g., CA-A-2054059, CA-A-2058901 or CA-A-2228692 referred to above, teaches the non-reinforcing nature of titanium oxides and the necessity of adding a reinforcing filler, such as carbon black or silica, to give a minimum level of reinforcement to the rubber compositions described.

Another aspect of the invention is the use of a rubber composition according to the invention for the manufacture of rubber articles, in particular tires or semi-finished rubber products intended for such tires, these semi-finished articles selected from the group consisting of treads, underlayers intended to be positioned beneath the treads, crown plies, sidewalls, carcass plies, beads, protectors, inner tubes and airtight internal rubbers for tubeless tires. The composition of the invention is particularly suitable for the manufacture of sidewalls or tire treads for tires intended to be fitted on passenger vehicles, vans, 4×4 vehicles, two-wheelers and heavy vehicles, aircraft, construction machinery, agricultural machinery or handling machinery. The treads may be used in the manufacture of new tires or for recapping worn tires.

Another subject of the invention are the tires and semifinished rubber products themselves comprising a rubber composition according to the invention.

A further subject of the invention is the use of a reinforcing titanium oxide for reinforcing a diene rubber composition usable for manufacturing tires.

A still further aspect of the invention is a process for reinforcing a diene rubber composition usable for the manufacture of tires, comprising incorporating a reinforcing titanium oxide into the diene rubber composition in the uncured state by thermo-mechanical kneading.

The rubber composition of the invention are particularly suited for the manufacture of colored tires or colored semifinished articles, such as treads or sidewalls. "Colored" rubber compositions, tires or rubber articles in the present description are understood to be rubber compositions, tires or articles, at least part of which is of a color, including white, other than the conventional black.

DESCRIPTION OF THE DRAWINGS

The invention and its advantages will be readily understood in the light of the description and examples of embodiment which follow, and FIGS. 1 to 4 relating to these examples in which.

DETAILED DESCRIPTION OF THE INVENTION

I. MEASUREMENTS AND TESTS USED

I-1. Characterization of the Reinforcing Fillers

The fillers described herein comprise agglomerates of particles, which may be disagglomerated into particles under the action of an external force, for example mechanical working or ultrasound. The term "particle" as used herein is understood to mean an aggregate, and not an elementary particle that may form part of this aggregate. The term "aggregate" is defined herein as an indivisible unit (i.e., which cannot be cut, divided or shared) which is produced upon synthesis of the filler, that is generally formed of elementary particles which are aggregated together.

These fillers are characterized as indicated hereafter.

a) BET specific surface area:

The BET specific surface area is determined, in accordance with the method of Brunauer, Emmet and Teller described in *"The Journal of the American Chemical Society"*, vol. 60, page 309, February 1938, corresponding to Standard AFNOR-NF-T45-007 (November 1987).

b) Average size of the particles $d_w$:

The average size (by mass) of the particles, $d_w$, is measured after dispersion of the filler to be analyzed by ultrasound disagglomeration in an aqueous solution of 0.6% by weight sodium hexametaphosphate.

Measurement takes place using a centrifugal X-ray detection sedimentometer type "XDC" ("X-ray Disk Centrifuge"), sold by Brookhaven Instruments, in accordance with the following method of operation.

A suspension containing 0.8 g of a sample of filler to be analyzed in 40 ml of water containing 6 g/l of sodium hexametaphosphate as surfactant is produced by action over 8 minutes at 60% power (60% of the maximum position of the output control) of a 1500-watt ultrasonic probe (Vibracell ¾ inch ultrasound generator sold by Bioblock). After ultrasound generation, 15 ml of the suspension is introduced into the rotating disc. After sedimentation for 120 minutes, the mass distribution of the particle sizes and the average size by mass of the particles, $d_w$, are calculated by the software of the "XDC" sedimentometer ($d_w=\Sigma(n_i d_i^5)/\Sigma(n_i d_i^4)$, where $n_1$=number of objects of the size or diameter $d_1$ class).

c) Disagglomeration rate $\alpha$:

The disagglomeration rate, $\alpha$, is measured using the "ultrasound disagglomeration test", at 100% power of a 600-watt probe. This test makes it possible to continuously measure the evolution of the average size (by volume) of the agglomerates of particles during ultrasound generation, as indicated below.

The setup used comprises a laser granulometer ("Mastersizer S", sold by Malvern Instruments, with a He—Ne red laser source, wavelength 632.8 nm) and its preparer ("Malvern Small Sample Unit MSX1"), between which is inserted a continuous-flow treatment cell (Bioblock M72410) provided with an ultrasonic probe (600-watt ultrasound generator, Vibracell ½ inch, sold by Bioblock).

A small quantity (40 mg) of filler to be analyzed is introduced into the preparer with 160 ml of an aqueous solution containing 0.5 g/l of sodium hexametaphosphate. The rate of circulation is set at its maximum. At least three consecutive measurements are made to determine the initial mean diameter (by volume) of the agglomerates, referred to as $d_v[0]$, in accordance with the known Fraunhofer calculation method (Malvern 3$$D calculation matrix). The ultrasound generation is then set at a power of 100% ("tip amplitude" in maximum position) and the evolution of the mean diameter by volume $d_v[t]$ as a function of the time "t" is monitored for about 8 minutes with one measurement approximately every 10 seconds. After an induction period (about 3–4 minutes), it was noted that the reciprocal of the mean diameter by volume $1/d_v[t]$ varies linearly, or substantially linearly, with the time "t" (steady state disagglomeration conditions). The disagglomeration rate a is calculated by linear regression of the curve of evolution of $1/d_v[t]$ as a function of the time "t", within the zone of stable disagglomeration conditions (generally, between about 4 and 8 minutes). It is expressed in $\mu m^{-1}/s$.

Figure 1:
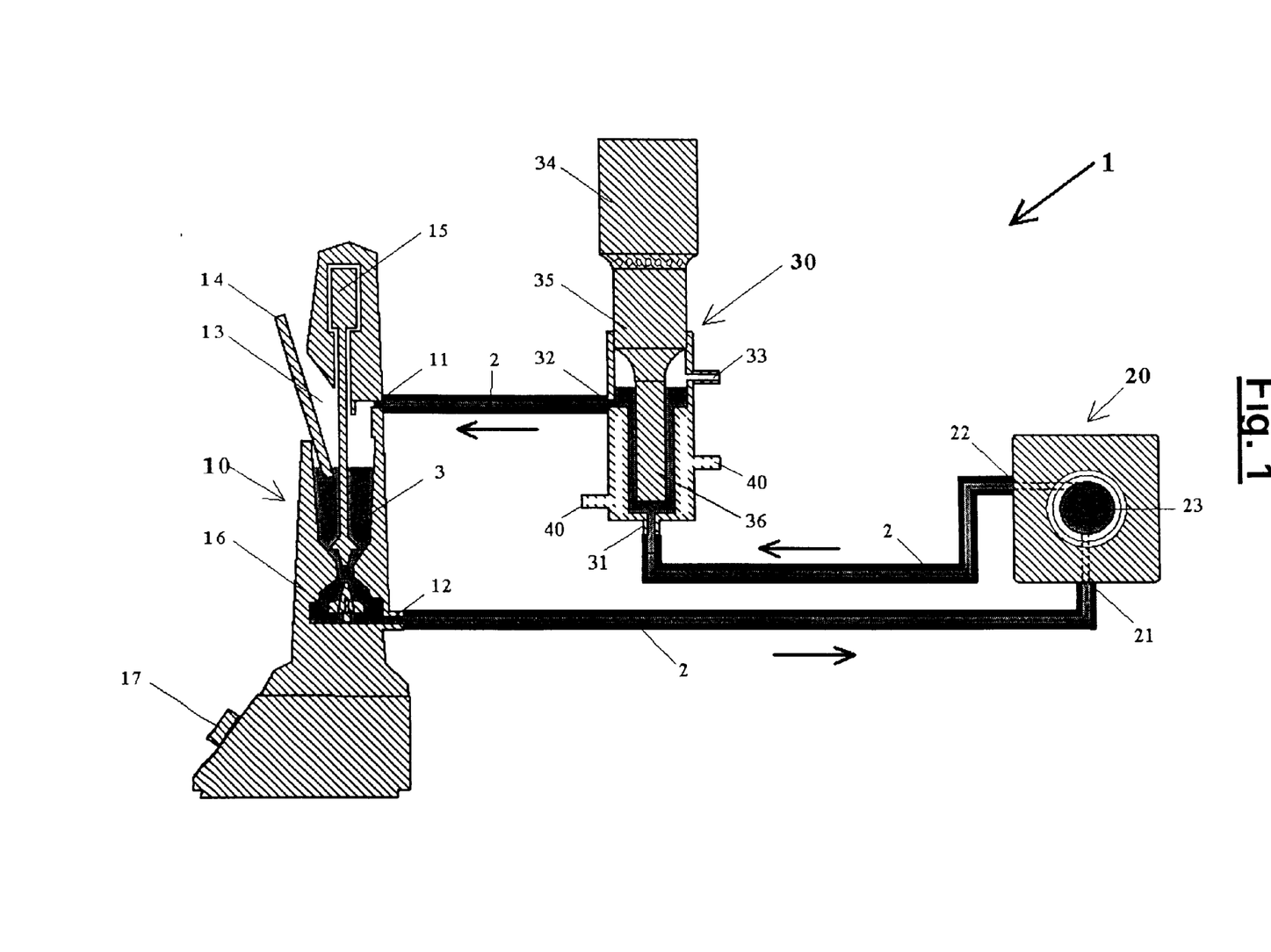
FIG. 1 is a diagram of a device suitable for measuring the ultrasound disagglomeration rate ($\alpha$) of a filler in the form of agglomerates.

FIG. 1 shows a diagram of the measuring device used for performing this ultrasound disagglomeration test. This device comprises of a closed circuit 1 within which a flow 2 of agglomerates of particles suspended in a liquid 3 can circulate. This device comprises a sample preparer 10, a laser granulometer 20 and a treatment cell 30. A vent to atmospheric pressure (13, 33), at the level of the sample preparer 10 and of the treatment cell 30 itself, permits continuous elimination of the air bubbles which form during ultrasound generation (i.e., the action of the ultrasonic probe).

The sample preparer 10 ("Malvern Small Sample Unit MSX1") is intended to receive the sample of filler to be tested (in suspension in the liquid 3) and to send it through the circuit 1 at the pre-controlled speed (potentiometer 17, maximum speed of approximately 3 1/min), in the form of a flow 2 of liquid suspension. Preparer 10 consists of a receiving tank which contains, and through which circulates, the suspension to be analyzed. It is equipped with a stirrer motor 15 of variable speed in order to prevent sedimentation of the agglomerates of particles of the suspension. A centrifugal mini-pump 16 is intended to circulate the suspension 2 in the circuit 1. The entrance 11 to the preparer 10 is connected to the open air by an opening 13 intended to receive the sample of filler to be tested and/or the liquid 3 used for the suspension.

A laser granulometer 20 ("Mastersizer S"), which continuously measures at regular time intervals, the average size "$d_v$" of the agglomerates as the flow 2 passes, by means of a measuring cell 23, to which are coupled the automatic recording and calculation means of the granulometer 20, is connected to preparer 10. Such laser granulometers utilize the principle of light diffraction by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of diffracted light for different diffraction angles in order to determine the size distribution (by volume) of the sample $d_v$, corresponding to the average size by volume of this distribution ($d_V = \Sigma(n_1 d_1^4)/\Sigma(n_1 d_1^3)$, where $n_1$=number of objects of the size or diameter $d_1$ class).

A processing cell 30 equipped with an ultrasonic probe 35 (converter 34 and probe head 36) intended continuously to break up the agglomerates of particles as the flow 2 passes is inserted between preparer 10 and laser granulometer 20.

The treatment cell 30 is arranged between the outlet 22 from the granulometer 20 and the inlet 11 to the preparer 10, such that, in operation, the flow 2 of particles emerging from the preparer 10 first passes through the laser granulometer 20 before entering the treatment cell 30. This arrangement has two major advantages for measurements. First, the air bubbles due to the action of the ultrasonic probe are eliminated on passing through the preparer 10 (which is in the open air), that is to say, before entering the granulometer 20; they therefore do not upset the laser diffraction measurement. Second, the homogeneity of the suspension is improved by first passing through the preparer 10.

Moreover, the treatment cell 30 is arranged such that the flow 2 of particles which penetrates therein, via an inlet 31, first passes in front of the head 36 of the ultrasonic probe 35. This unconventional arrangement (the flow 2 entering from the bottom 31 of the cell, and not from the top 32) has the following advantages: First, all the circulating suspension 2 is forced to pass in front of the end 36 of the ultrasonic probe 35, which is the zone most active in terms of disagglomeration. Second, this arrangement permits initial degasification after ultrasound generation in the body of the treatment cell 30 itself, the surface of the suspension 2 then being in contact with the atmosphere by means of a pipe 33 of small diameter.

The flow 2 is preferably thermostatically controlled by means of a cooling circuit 40 arranged, at the level of the cell 30, in a double casing surrounding the probe 35, the temperature being controlled, for example, by a heat sensor 14 immersed in the liquid 3 at the level of the preparer 10. The arrangement of the various elements of the measuring device is optimized so as to restrict as far as possible the circulating volume, i.e., the length of the connecting tubes (for example, flexible tubes).

I-2. Characterization of the rubber compositions

The rubber compositions are characterized, before and after curing, as indicated below.

a) Mooney plasticity:

An oscillating consistometer such as described in standard AFNOR-NFT-43005 (November 1980) is used. The Mooney plasticity is measured in accordance with the following principle: the uncured composition is molded in a cylindrical enclosure heated to 100° C. After preheating for one minute, the rotor turns within the test piece at 2 rpm, and the torque used for maintaining this movement is measured after rotation for four minutes. The Mooney plasticity (MS 1+4) is expressed in "Mooney units" (MU), with 1 MU=0.83 N.m (Newton.meter).

b) Tensile tests:

These tests make it possible to determine the elasticity stresses and the breaking properties. Unless indicated otherwise, they are carried out in accordance with the standard AFNOR-NFT-46002 (September 1988).

The secant moduli at 10% elongation (M10), 100% elongation (M100) and 300% elongation (M300) are measured. These moduli are calculated reduced to the real section of the test piece and, unless indicated otherwise, are measured in a second elongation (i.e., after an accommodation cycle). All these tensile measurements are carried out under normal conditions of temperature and humidity in accordance with the standard AFNOR-NFT-40101 (December 1979). Processing the recorded tensile data also makes it possible to trace the curve of the modulus as a function of elongation (see FIG. 4), the modulus used here being the secant modulus measured in a first elongation (i.e., without an accommodation cycle), calculated reduced to the real cross-section of the test piece.

c) Hysteresis losses:

The hysteresis losses (HL) are measured by rebound at 60° C. at the sixth impact, and are expressed in % in accordance with the following equation:

$$HL(\%) = 100[(W_0 - W_1)/W_0],$$

where $W_0$=energy supplied; $W_1$=energy restored.

d) Dynamic properties:

The dynamic properties, referred to $\Delta G^*$ and tan $(\delta)_{max}$, measured as a function of deformation, are carried out at 10 Hz with a peak-to-peak deformation of 0.15% to 50%. The non-linearity $\Delta G^*$ is the difference in the shear modulus between 0.15% and 50% deformation, expressed in MPa. The hysteresis is expressed by the measurement of tan $(\delta)_{max}$ which corresponds to the maximum of tan $(\delta)_{max}$ which corresponds to the maximum of tan $(\delta)$.

II. CONDITIONS OF CARRYING OUT THE INVENTION

In addition to the usual additives or those capable of being used in a sulphur-cross-linkable rubber composition which can be used for the manufacture of tires, the compositions according to the invention comprise, as base constituents, (i) one or more diene elastomer(s), (ii) at least one reinforcing white filler and (iii) at least one coupling agent between the filler and the elastomer, said reinforcing filler comprising a reinforcing titanium oxide as described in detail hereafter.

II-1. Diene elastomer

"Diene" elastomer or rubber is understood to mean, in known manner, an elastomer resulting at least in part (i.e., a homopolymer or a copolymer) from diene monomers (monomers bearing two double carbon—carbon bonds, whether conjugated or not).

Generally, "essentially unsaturated" diene elastomer is understood to mean a diene elastomer resulting at least in part from conjugated diene monomers having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean a diene elastomer having a content of units of diene origin (conjugated dienes) which is greater than 50%.

These definitions being given, the following are understood in particular to be meant by diene elastomer capable of being used in the compositions according to the invention:

(a) any homopolymer obtained by polymerization of a conjugated diene monomer having 4 to 12 carbon atoms;

(b) any copolymer obtained by copolymerization of one or more dienes conjugated together or with one or more vinyl aromatic compounds having 8 to 20 carbon atoms;

(c) any ternary copolymer obtained by copolymerization of ethylene, and an α-olefin having 3 to 6 carbon atoms with a non-conjugated diene monomer having 6 to 12 carbon atoms, such as the elastomers obtained from ethylene, from propylene with a non-conjugated diene monomer of the aforementioned type, including inter alia 1,4-hexadiene, ethylidene norbornene or dicyclopentadiene;

(d) any copolymer of isobutene and isoprene (butyl rubber), as well as halogenated, in particular chlorinated or brominated, versions of this type of copolymer.

Although it applies to any type of diene elastomer, a person skilled in the tire art will understand that the present invention, in particular when the rubber composition is intended for a tire tread, is used primarily with essentially unsaturated diene elastomers, in particular those of type (a) or (b) above.

Particularly suitable conjugated dienes are, 1,3-butadiene, 2-methyl-1,3-butadiene, the 2,3-di(C1 to C5 alkyl)-1,3-butadienes, such as 2,3-dimethyl-1,3-butadiene, 2,3-diethyl-1,3-butadiene, 2-methyl-3-ethyl-1,3-butadiene, and 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers comprise between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequenced or microsequenced elastomers, and may be prepared in dispersion or in solution. They may be coupled and/or starred or alternatively functionalized with a coupling and/or starring or functionalizing agent.

The following are preferred polymers: polybutadienes, in particular those having a content of 1,2-units between 4% and 80%, or those having a content of cis-1,4 bonds of more than 80%; polyisoprenes; butadiene-styrene copolymers, in particular those having a styrene content of between 5% and 50% by weight and, more particularly, between 20% and 40%, a content of 1,2-bonds of the butadiene part of between 4% and 65%, and a content of trans-1,4 bonds of between 20% and 80%; butadiene-isoprene copolymers, particularly those having an isoprene content of between 5% and 90% by weight and a glass transition temperature (Tg) of between −40° C and −80° C; and isoprene-styrene copolymers, particularly those having a styrene content of between 5% and 50% by weight and a Tg of between −25° C and −50° C.

Particularly suitable butadiene-styrene-isoprene copolymers include those having a styrene content of between 5% and 50% by weight, particularly between 10% and 40%, an isoprene content of between 15% and 60% by weight, and more particularly between 20% and 50%, a butadiene content of between 5% and 50% by weight, more particularly between 20% and 40%, a content of 1,2-units of the butadiene part of between 4% and 85%, a content of trans-1,4 units of the butadiene part of between 6% and 80%, a content of 1,2-plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

According to a preferred embodiment of the invention, the diene elastomer of the composition according to the invention is a highly unsaturated diene elastomer selected from the group consisting of polybutadienes (BR), polyisoprenes (IR), natural rubber (NR), butadiene-styrene copolymers (SBR), butadiene-isoprene copolymers (BIR), butadiene-acrylonitrile copolymers (NBR), isoprene-styrene copolymers (SIR), butadiene-styrene-isoprene copolymers (SBIR) and mixtures thereof.

When the composition according to the invention is intended for use in a tire tread, the diene elastomer is preferably a butadiene-styrene copolymer, prepared in solution, having a styrene content of between 20% and 30% by weight, a content of vinyl bonds of the butadiene part of between 15% and 65%, a content of trans-1,4 bonds of between 20% and 75%, and a glass transition temperature Tg of between −20° C. and −55° C. This butadiene-styrene copolymer may also be used in a mixture with a polybutadiene having preferably more than 90% cis-1,4 bonds.

In a further embodiment intended for use in a tire sidewall, the composition according to the invention may contain at least one essentially saturated diene elastomer, in particular at least one EPDM copolymer. This copolymer may be used in a mixture with one or more of the highly unsaturated diene elastomers referred to above, or not.

The compositions of the invention may contain a single diene elastomer or a mixture of several diene elastomers. The diene elastomer or elastomers may also be used in association with any type of synthetic elastomer other than a diene one, or even with polymers other than elastomers, such as thermoplastic polymers.

II-2. Reinforcing filler

As used herein, a "reinforcing" white filler is understood to mean a white filler (i.e., an inorganic filler, particularly a mineral filler, sometimes also called "clear filler") which is capable, on its own, without any means other than an intermediate coupling agent, of reinforcing a rubber composition intended for the manufacture of tires. In other words a reinforcing white filler can replace a conventional filler of tire-grade carbon black in its reinforcement function.

The composition according to the invention is reinforced by a reinforcing white filler, comprising a reinforcing titanium oxide having the following characteristics:
  (a) its specific BET surface area is between 20 and 200 m$^2$/g;
  (b) its average particle size (by mass), $d_w$, is between 20 and 400 nm; and
  (c) its disagglomeration rate, $\alpha$, measured using the ultrasound disagglomeration test, at 100% power of a 600-watt ultrasonic probe, is greater than $2 \times 10^{-2}$ $\mu m^{-1}$/s.

"Titanium oxide" is understood herein to mean any compound of formula $TiO_2$ and its possible hydrated forms, irrespective of its crystalline structure (e.g., rutile, anatase or a mixture of the two crystalline varieties). It must satisfy, in combination, all the characteristics (a) to (d) above.

It is generally known that in order to obtain the optimum reinforcement properties imparted by a filler, it is important for the filler to be present in the rubber matrix in a final form which is both as finely divided and distributed as homogenously as possible. Such conditions can be achieved only if the filler can be readily incorporated in the matrix during mixing with the elastomer and disagglomerates in order to be dispersed homogenously in the matrix.

The intrinsic dispersibility of a filler can be evaluated using the ultrasound disagglomeration test described in Section I above, to measure its disagglomeration rate $\alpha$.

For a rate $\alpha$ greater than $2 \times 10^{-2}$ $\mu m^{-1}$/s, the titanium oxide has good dispersibility. Only a few micronic agglomerates are observed by reflection in optical microscopy on a section of rubber composition prepared according to known techniques. To obtain even better dispersion of the reinforcing titanium oxide in the diene rubber matrix and, therefore, optimum reinforcement, the disagglomeration rate $\alpha$ is preferably greater than $5 \times 10^{-2}$ $\mu m^{-1}$/s. This latter rate is particularly advantageous for compositions used for manufacturing tire treads having a low rolling resistance.

When the BET surface area of the titanium oxide is less than 20 m$^2$/g, the compositions have easier working and a reduced hysteresis, but there is a decline in the breaking and wear resistance properties in the tire. When the BET surface area is greater than 200 m$^2$/g, working in the uncured state becomes more difficult (higher Mooney plasticity) resulting in reduced dispersion of the filler in the matrix. Excessively large sized particles $d_W$, greater than 400 nm, act like defects which localize stresses and are harmful in terms of wear. When size $d_W$ is too small, i.e., less than 20 nm, working in the uncured state and the dispersion of the filler during this working are impaired. Thus, the BET surface area preferably lies within a range from 30 to 150 m$^2$/g and the particle size $d_W$ preferably lies within a range from 30 to 200 nm.

When the compositions of the invention are intended for use in tire treads having low rolling resistance, the reinforcing titanium oxides have at least one of the following characteristics, preferably both:
  BET surface area within a range of 40 to 140 m$^2$/g;
  particle size $d_w$ within a range of 50 to 150 nm.

Moreover, the reinforcing titanium oxide particles have sufficient surface reactivity, i.e., a sufficient number of (Ti—OH) surface functions which are reactive with respect to the coupling agent, which is particularly beneficial to the reinforcement function performed by the filler, and hence to the mechanical properties of the rubber compositions of the invention.

The physical state of the reinforcing titanium oxide includes powder, microbeads, granules, pellets, spheres or any other densified form.

The reinforcing titanium oxide described above may be used on its own or in association with one or more other reinforcing filler(s), for example a second white filler such as a silica or a reinforcing alumina. Preferred reinforcing silicas include dispersible precipitated silica, in particular when the invention is used to manufacture tires having low rolling resistance. Non-limiting examples of such preferred highly dispersible silicas include the silicas BV3380 and Ultrasil 7000 from Degussa, the silicas Zeosil 1165MP and 1115MP from Rhône-Poulenc, the silica Hi-Sil 2000 from PPG and the silicas Zeopol 8715 or 8745 from Huber. A preferred reinforcing alumina includes a highly dispersible alumina, such as described in application EP-A-0 810 258. Specific examples include aluminas A125 or CR125 (from Balkowski), APA-100RDX (from Condea), Aluminoxid C (from Degussa) or AKP-G015 (Sumitomo Chemicals).

The reinforcing titanium oxide, alone or optionally in association with a second white filler, also may be used in a blend, i.e., in a mixture, with one or more conventional tire-grade carbon blacks. Suitable carbon blacks include all the carbon blacks, in particular the carbon blacks HAF, ISAF or SAF, conventionally used in tires, particularly in treads. Non-limiting examples of such blacks include the blacks N115, N134, N234, N339, N347 and N375. The quantity of carbon black present in the total reinforcing filler may vary within wide limits, but is preferably less than the quantity of reinforcing white filler present in the rubber composition.

In the compositions of the invention, the reinforcing titanium oxide preferably constitutes the majority, i.e. more than 50% by weight, of the total reinforcing filler. It may advantageously constitute the entire reinforcing filler.

Preferably, the amount of total reinforcing filler in the compositions of the invention lies in a range from 20 to 400 phr (parts per 100 parts by weight of elastomer), more preferably from 30 to 200 phr. The optimum differs according to the intended applications. For example, the level of reinforcement expected for a bicycle tire is less than that required for a tire for a passenger vehicle or for a utility vehicle, such as a heavy vehicle. When the compositions of the invention are intended for tire treads, the amount of reinforcing white filler is preferably between 50 and 150 phr.

A preferred example of reinforcing titanium oxide, suitable for the rubber compositions of the invention, is the titanium oxide sold by Degussa under the name "P25" (approximately 70% anatase and 30% rutile by weight—puritz>99.5%). P25 is sold for use as an anti-UV protective agent in cosmetic or medicinal preparations, or as a thermal stabilizer of silicone polymers.

II-3. Coupling agent

When a reinforcing white filler, such as a silica or a reinforcing alumina is used in rubber compositions, it is well-known that a (white filler/elastomer) coupling agent, also referred to as a bonding agent, should be used, the role of which is to produce a bond (or "coupling") between the white filler and the elastomer, while facilitating the dispersion of this white filler within the elastomeric matrix.

The reinforcing titanium oxide also requires the use of such a coupling agent in order fully to perform its function of reinforcing filler in the rubber compositions according to the invention.

"Coupling" agent (filler/elastomer) is more precisely understood to mean an agent capable of establishing a sufficient chemical and/or physical connection between the filler and the elastomer, while facilitating the dispersion of the filler within the elastomeric matrix. Such a coupling agent, which is at least bifunctional, has the simplified general formula "Y-T-X", in which:

Y represents a functional group ("Y" function) which is capable of bonding physically and/or chemically with the white filler, such a bond being able to be established, for example, between a silicon atom of the coupling agent and the surface hydroxyl (OH) groups of the filler (for example, surface silanols in the case of silica);

X represents a functional group ("X" function) which is capable of bonding physically and/or chemically with the elastomer, for example, by means of a sulphur atom;

T represents a hydrocarbon group that links Y and X.

The coupling agents are not to be confused with simple agents for covering the white filler which, in known manner, comprise the Y function which is active with respect to the filler but are devoid of the X function which is active with respect to the elastomer.

Coupling agents, of variable effectiveness, have been described in a large number of documents and are well-known to the person skilled in the art. In fact, any known coupling agent may be used to ensure, in diene rubber compositions which can be used for the manufacture of tires, the effective bonding or coupling between the white reinforcing filler, e.g., titanium oxide, and diene elastomer. These coupling agents include organosilanes, in particular polysulphurized alkoxysilanes or mercaptosilanes, or polyorganosiloxanes bearing the X and Y functions described above.

In particular, polysulphurized alkoxysilanes such as described in U.S. Pat. Nos. 3,842,111; 3,873,489; 3,978,103; 3,997,581; 4,002,594; 5,580,919; 5,583,245; 5,663,396; 5,684,171; 5,684,172; and 5,696,197, which describe such known compounds in detail, are used.

"Symmetrical" polysulphurized alkoxysilanes which satisfy the following general formula (I) are particularly suitable for use in the invention, without the definition below being limiting:

$$Z-A-S_n-A-Z, \qquad (I)$$

in which:

n is an integer from 2 to 8 (preferably 2 to 5);

A is a divalent hydrocarbon (preferably a $C_1$–$C_{18}$ alkylene or a $C_6$–$C_{12}$ arylene, more preferably a $C_1$–$C_{10}$, alkylene, still more preferably a $C_2$–$C_4$, alkylene, in particular propylene); and Z corresponds to one of the formulae below:

in which:

$R^1$, which may or may not be substituted, and may be identical or different, represents a $C_1$–$C_{18}$ alkyl group, a $C_5$–$C_{18}$ cycloalkyl group, or a $C_6$–C18 aryl group (preferably a $C_1$–$C_6$ alkyl group, a cyclohexyl or a phenyl group, in particular a $C_1$–$C_4$ alkyl group, more particularly methyl and/or ethyl), $R^2$, which may or may not be substituted, and may be identical or different, represents a $C_1$–$C_{18}$ alkoxyl group or a $C_5$–$C_{18}$ cycloalkoxyl group (preferably a $C_1$–$C_8$ alkoxyl group or a $C_5$–$C_8$ cycloalkoxyl group, more particularly methoxyl and/or ethoxyl).

In commercially available polysulphurized alkoxysilanes in accordance with Formula (I) above, in particular mixtures, it will be understood that the average value of the "n"s is a fractional number, preferably between 2 and 5.

Suitable polysulphurized alkoxysilanes include the polysulphides (in particular the disulphides or tetrasulphides) of bis(alkoxy($C_1$–$C_4$)-silylpropyl), in particular bis(trialkoxy($C_1$–$C_4$)-silylpropyl), in particular polysulphides of bis(3-trimethoxysilylpropyl) or of bis(3-triethoxysilylpropyl). Preferably bis(3-triethoxysilylpropyl) tetrasulphide, abbreviated TESPT, having the formula $[(C_2H_5O)_3Si(CH_2)_3S_2]_2$, or bis(triethoxysilylpropyl) disulphide, abbreviated TESPD, having formula $[(C_2H_5O)_3Si(CH_2)_3S]_2$ are used. TESPD is sold, for example, by Degussa under the names Si266 or Si75 (in the latter case, in the form of a mixture of disulphide (75% by weight) and polysulphides), or alternatively by Witco under the name Silquest A1589. TESPT is sold, for example, by Degussa under the name Si69 (or X50S when it is supported to 50% by weight on carbon black), or alternatively by Witco under the name Silquest A1289 (in both cases, a commercial mixture of polysulphides having an average value of n which is close to 4).

A person skilled in the art will be able to adjust the content of coupling agent in the compositions of the invention, according to the intended application, the nature of the elastomer used, and the quantity of reinforcing titanium oxide, optionally supplemented by any other white filler used as complementary reinforcing filler.

So as to allow for the differences in specific surface area and density of the reinforcing white fillers which may be used, as well as the molar masses of the coupling agents, it is preferable to determine the optimum amount of coupling agent, in moles per square meter of reinforcing white filler, for each white filler used. This optimum amount is calculated from the weight ratio [coupling agent/reinforcing white filler], the BET surface area of the filler and the molar mass of the coupling agent (referred to as M hereafter), according to the following equation:

(moles/m² white filler)=[coupling agent/white filler](1/BET) (1/M)

Preferably, the quantity of coupling agent used in the compositions according to the invention is between $10^{-7}$ and $10^{-5}$ moles per square meter of total reinforcing white filler, i.e., per square meter of reinforcing titanium oxide when the latter constitutes the sole reinforcing white filler present. More preferably, the amount of coupling agent is between $5 \times 10^{-7}$ and $5 \times 10^{-6}$ moles per square meter of total reinforcing white filler. Generally, the amount of coupling agent, relative to the weight of diene elastomer, will preferably be between 1 and 20 phr, more preferably between 3 and 15 phr.

The coupling agent may first be grafted (via the "X" function) on to the diene elastomer of the composition of the invention, resulting in a functionalized or "precoupled" elastomer which comprises the free "Y" function for coupling to the reinforcing titanium oxide. Alternatively, the coupling agent could be grafted (via the "Y" function) onto the reinforcing titanium oxide to produce a "precoupled" filler which is then bonded to the diene elastomer by means of the free "X" functions.

It is preferred to use the coupling agent in the free (i.e., non-grafted) state or grafted onto the reinforcing titanium oxide, preferably because of better working ("processability") of the compositions in the uncured state.

II-4. Various additives

The compositions according to the invention contain, in addition to the compounds already described, all or part of the constituents usually used in diene rubber compositions intended for the manufacture of tires, such as plasticizers, pigments, protective agents, such as antioxidants and antiozonants, a cross-linking system based either on sulphur or on sulphur and/or peroxide and/or bismaleimide donors, vulcanization accelerators, vulcanization activators, extending oils, etc. A conventional non-reinforcing white filler, such as clay, bentonite, talc, chalk or kaolin, or even a conventional titanium oxide, which has a known function of pigmentation agent or anti-UV protection, may be optionally associated with the reinforcing white filler of the invention.

For producing colored rubber compositions, it is thus possible to use any type of coloring agent known to a person skilled in the art. The coloring agent may be organic or inorganic, and soluble or insoluble in the compositions according to the invention. For example, mineral colorants, such as powdered metals, in particular powdered copper or aluminium, or various metal oxides, in particular silicates, aluminates or titanates, iron oxides or hydroxides, and mixed oxides of different metallic elements, such as Co, Ni, Al or Zn, may be used. Also, organic pigments, such as indanthrones, diketo-pyrrolo-pyrroles or diazo condensates, or organometallic pigments, such as phthalocyanines, may be used in the compositions. The color of colored rubber compositions according to the invention can thus vary within a wide range, for example different shades of red, orange, green, yellow, blue or alternatively brown or grey. It is also possible to produce a rubber composition without adding a coloring agent, and thus to retain the original color of the reinforcing filler, whether the latter be white or have been precolored.

Protection systems such as described in applications WO99/02590 and WO99/06480 may be used for anti-aging protection of colored rubber compositions according to the invention.

Rubber compositions according to the invention may additionally contain covering agents (comprising the single function Y) for the reinforcing white filler. Such covering agents provide an improvement in the dispersion of the white filler in the rubber matrix and a reduction in the viscosity of the compositions, which improves their ease of working in the uncured state. Such covering agents include alkyl alkoxysilanes (in particular alkyl triethoxysilanes), polyols, polyethers (for example polyethylene glycols), primary, secondary or tertiary amines, hydroxylated or hydrolyzable polyorganosiloxanes, for example, α,ω-dihydroxy-polyorganosiloxanes (in particular α,ω-dihydroxy-polydimethylsiloxanes).

II-5. Preparation of the compositions

The rubber compositions are prepared using the diene elastomers according to known techniques such as by thermomechanical working in one or two stages in an internal paddle mixer, followed by mixing on an external mixer, during which the vulcanization (cross-linking) system is incorporated, as described, e.g., in Application EP-A-0 501 227.

In a conventional one-stage process, all of the constituents of the composition, except the vulcanization system, are introduced into a conventional internal mixer. When the apparent density of the filler is low, it may be preferable to divide the introduction thereof into several parts. The result of the first kneading stage is then taken up on an external mixer, generally an open mill, and then the vulcanization system is added. A second stage may be added in the internal mixer, essentially with the aim of subjecting the mix to complementary thermomechanical treatment.

The invention relates to the rubber compositions both in the uncured state (i.e., before curing) and in the cured state (i.e., after cross-linking or vulcanization).

The compositions according to the invention may be used alone or in a blend with any other rubber composition usable for manufacturing tires.

III. EXAMPLES OF EMBODIMENT OF THE INVENTION

III-1. Fillers used

The characteristics of the fillers used in the following examples are set forth in Table 1. Filler A is the reinforcing titanium oxide (P25 from Degussa). Filler B is a conventional (i.e., non-reinforcing) titanium oxide that can be used as a white pigment in white colored tire sidewalls(Pronox RKB6 from Bayer). Filler A advantageously satisfies all the preferred characteristics of a titanium oxide filler of the invention:

BET surface area within a range from 40 to 140 $m^2/g$;

particle size $d_w$ within a range from 50 to 150 nm; and disagglomeration rate α greater than $5 \times 10^{-2}$ $\mu m^{-1}/s$.

Figure 2:
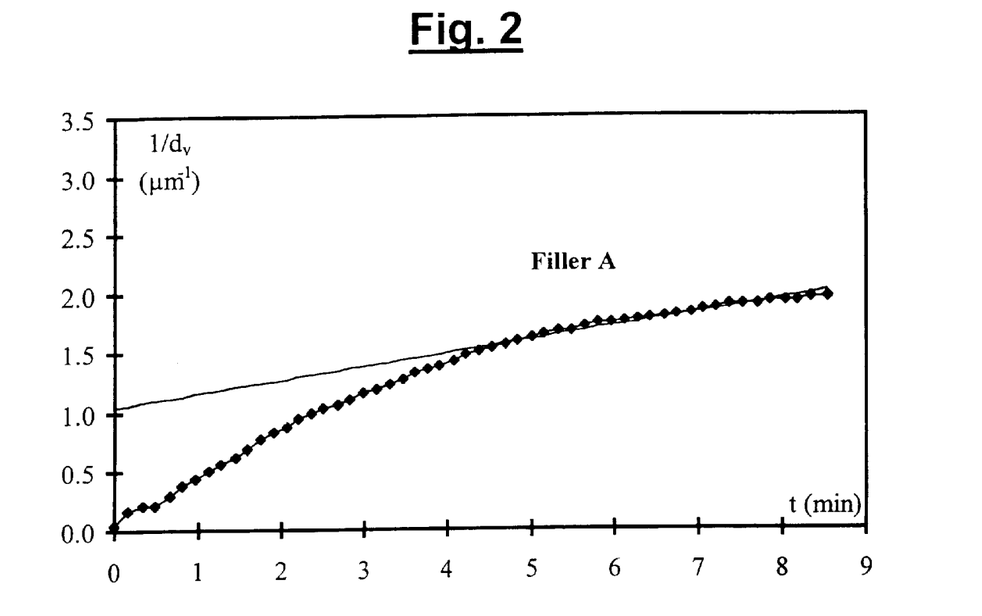
FIG. 2 and FIG. 3 are curves of the change in the size of the agglomerates during ultrasound generation using the device of FIG. 1, for fillers whether or not in accordance with the invention, from which curves the disagglomeration rates $\alpha$ are determined.
Figure 3:
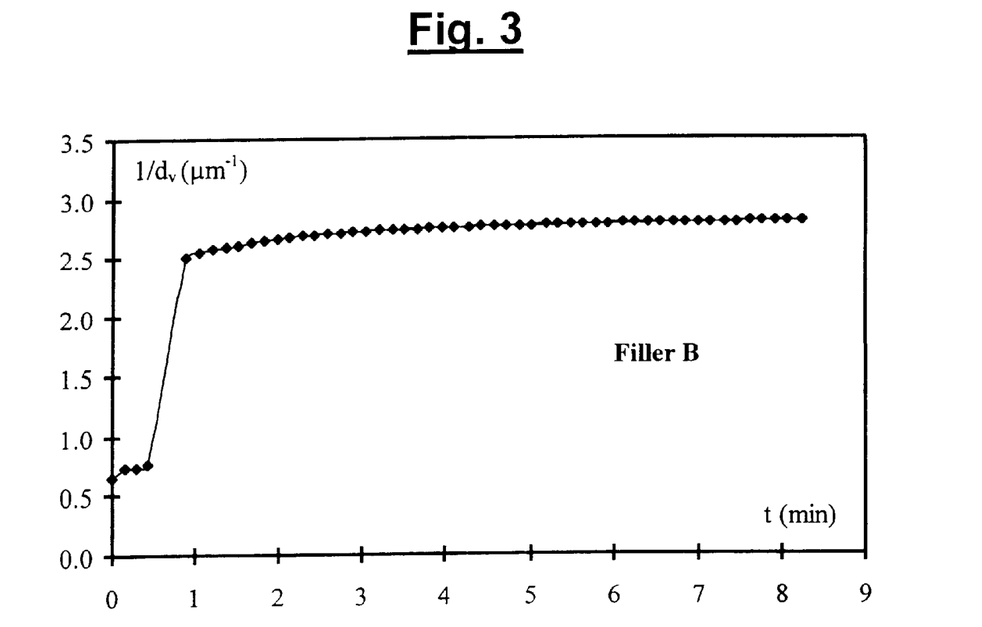

FIGS. 2 and 3 depict the curves of evolution $[1/d_v(t)=f(t)]$ of the size of the agglomerates, recorded in the ultrasound disagglomeration test for Fillers A and B, respectively. It can clearly be seen from FIGS. 2 and 3 (particularly FIG. 3) that the first points recorded ("t" varying from 0 to about 30 s) correspond to the measurement of the initial mean diameter $d_v[0]$, followed (after actuation of the ultrasonic probe) by progressive passage (here, "t" from 30 s to about 4 min for Filler A) to steady state conditions of disagglomeration, during which the reciprocal of "$d_v$" varies linearly with the time "t". The recording of the data was stopped here after about 8 minutes. The disagglomeration rate α in the zone of steady state disagglomeration conditions is deduced by elementary calculation of linear regression, performed by the calculator of the granulometer (between 4 and 8 minutes approximately).

III-2. Preparation of the compositions

The compositions used in the tests are prepared as follows: The diene elastomer is introduced into an internal mixer having a capacity of 300 ml, filled to 75%, wherein the initial tank temperature is approximately 90° C. After a suitable kneading time, e.g., 1 minute, all the other ingredients except the vulcanization system are added, including the filler and associated coupling agent. Thermomechanical working is then performed for 10 minutes, with an average blade speed of 70 rpm, until a dropping temperature of about 160° C. is obtained.

The mixture thus obtained is recovered and the vulcanization system (sulphur and a sulphenamide primary accelerator) is added on an external mixer (homo-finisher) at 30° C. The vulcanization (curing) is carried out at 150° C. for 40 minutes.

III-3. Tests

Two diene rubber compositions intended for the manufacture of tires or treads for tires, in particular for colored tires, are compared below.

The diene elastomer is an SBR (styrene-butadiene copolymer), prepared in solution, comprising 25% styrene, 58% 1,2-polybutadiene units and 23% polybutadiene trans-1,4 units.

The two compositions are identical, except for the following:
Composition No. 1 (in accordance with the invention): Filler A, reinforcing titanium oxide;
Composition No. 2 (not in accordance with the invention): Filler B, conventional, non-reinforcing titanium oxide.

The coupling agent TESPT (Si69) was introduced in an amount corresponding to a surface coverage of approximately $9.4 \times 10^{-7}$ mole/m$^2$ of white filler (titanium oxide A or B), where Filler A is a reinforcing filler and Filler B is not. For carrying out this comparative test, the coupling agent was also used in control Composition No. 2 which comprises only conventional (non-reinforcing) titanium oxide. In these compositions, the titanium oxides (Fillers A and B) are used in an iso-volume relative to each other.

Figure 4:
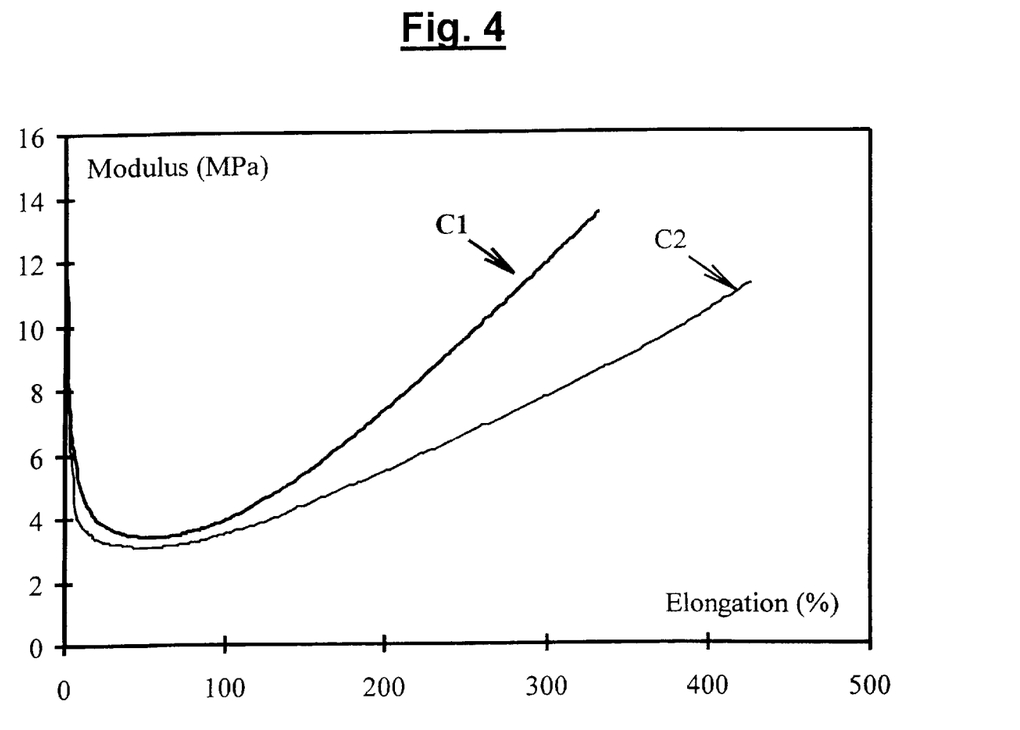
FIG. 4 depicts curves of the variation of modulus as a function of elongation for different diene rubber compositions, whether or not in accordance with the invention.

Table 2 shows the formulation of the different compositions (amount of the different products expressed in phr) and Table 3 shows their properties before and after curing at 150° C. for 40 minutes. FIG. 4 shows the curves of modulus (in MPa) as a function of the elongation (in %). These curves are marked C1 and C2 and correspond to rubber Compositions No. 1 and No. 2, respectively.

The results show that Composition No. 1, after curing, has a level of reinforcement which is significantly higher than that of control Composition No. 2:
higher breaking stress (by more than 27%);
moduli at the high deformations (M100 and M300) and ratio (M300/M100) significantly higher, which clearly indicates to the person skilled in the art better reinforcement by the Composition No. 1 according to the invention;
FIG. 4 confirms these results: for elongations of 100% and more, the modulus is significantly greater in the case of Composition No. 1, and even more so as the elongation increases; this behavior clearly illustrates a far better interaction between the reinforcing white filler and the elastomer.

The hysteresis properties (losses HL, dynamic properties $\Delta G^*$ and $\tan(\delta)_{max}$) also indicate a substantial gain (i.e. a lower hysteresis) compared with conventional compositions reinforced with carbon black (comparatively, HL of the order of 32%, $\Delta G^*$ of about 6.3 MPa and $\tan(\delta)_{max}$ of approximately 0.36 for a tire-grade carbon black type N234).

The Mooney plasticity values remain low both on the control Composition No. 2 (which was expected, given the absence of reinforcement by the conventional titanium oxide), as well as on Composition No. 1 according to the invention filled with reinforcing titanium oxide, compared, with conventional compositions reinforced with carbon black (plasticity of 64 MU approximately, using N234 carbon black). This means that the compositions according to the invention have good processing ability in the uncured state.

In summary, the specific titanium oxides used to reinforce the compositions according to the invention impart numerous advantageous properties to the compositions, in particular when they are used in colored tires having low rolling resistance, or in colored treads intended for such tires:
An improvement in the resistance to aging and to the action of UV rays, which is particularly beneficial to the aesthetics and to the stability of the colors;
An improvement in the hysteresis, resulting in reduction in the rolling resistance and an improvement in grip on wet, icy or snow-covered ground, compared with carbon black.

A capacity of reinforcement, and hence of wear resistance, for the compositions containing them which were hitherto unknown with the titanium oxides conventionally used in tire rubber compositions of the prior art.

TABLE 1

| TiO$_2$ filler: | A | B |
|---|---|---|
| He Density (g/ml) | 3.81 | 3.85 |
| BET surface area (m$^2$/g( | 50 | 9 |
| d$_w$ (nm) | 91 | 1860 |
| α ($\mu$m$^{-1}$/s) | 0.113 | 0.013 |

TABLE 2

| Composition No. | 1 | 2 |
|---|---|---|
| SBR (1) | 100 | 100 |
| Filler A | 95 | — |
| Filler B | — | 96 |
| Si69 | 2.4 | 0.4 |
| ZnO | 2.5 | 2.5 |
| Anti-ozone wax | 1.5 | 1.5 |
| stearic acid | 2 | 2 |
| antioxidant (2) | 1.9 | 1.9 |
| DPG (3) | 0.6 | 0.6 |
| sulphur | 1.5 | 1.5 |
| CBS (4) | 2.5 | 2.5 |

(1) Butadiene-styrene copolymer
(2) N-1,3-dimethylbutyl-N-paraphenylenediamine
(3) Diphenylguanidine
(4) N-cyclohexyl-2-benzothiazylsulphenamide

TABLE 3

| Composition No. | 1 | 2 |
|---|---|---|
| Plasticity (MU) | 42 | 28 |
| M10 (MPa) | 4.1 | 3.1 |
| M100 (MPa) | 3.5 | 3.0 |
| M300 (MPa) | 8.6 | 4.6 |
| M300/M100 | 2.5 | 1.5 |
| Breaking stress (MPa) | 9.8 | 7.4 |
| HL (%) | 16.9 | 0.45 |
| $\Delta G^*$ (MPa) | 1.69 | 0.45 |
| $\tan(\delta)_{max}$ | 0.260 | 0.168 |

What is claimed is:

1. A rubber composition usable for the manufacture of tires, comprising, as base constituents, a diene elastomer, a white filler as reinforcing filler and a coupling agent (white filler/elastomer) that links the reinforcing filler and the elastomer, the white filler comprising a titanium oxide having the following characteristics:
(a) its specific BET surface area is between 20 and 200 m$^2$/g;
(b) its average particle size (by mass), d$_w$, is between 20 and 400 nm; and
(c) its disagglomeration rate, α, measured by the ultrasound disagglomeration test, at 100% power of a 600-watt ultrasonic probe, is greater than $2 \times 10^{-2}$ $\mu$m$^{-1}$/s.

2. The composition according to claim 1, wherein the total quantity of reinforcing filler is between 20 and 400 phr (parts by weight to one hundred parts of elastomer).

3. The composition according to claim 1, wherein the BET surface area of the titanium oxide is within a range of 30 to 150 m$^2$/g.

4. The composition according to claim 1, wherein the average particle size $_w$ of the titanium oxide is between 30 to 200 nm.

5. The composition according to claim 1, wherein the disagglomeration rate α of the titanium oxide is greater than $5\times10^{-2}$ μm$^{-1}$/s.

6. The composition according to claim 1, wherein the reinforcing white filler comprises more than 50% by weight titanium oxide.

7. The composition according to claim 1, wherein the total reinforcing white filler is titanium oxide.

8. The composition according to claim 1, wherein the reinforcing white filler further comprises silica and/or alumina.

9. The composition according to claim 1, further comprising one or more carbon blacks as a reinforcing filler.

10. The composition according to any of claims 1 and 9, wherein the quantity total of reinforcing filler is between 30 and 200 phr.

11. The composition according to claim 1, wherein the quantity of coupling agent is between $10^{-7}$ and $10^{-5}$ mole per square meter of reinforcing white filler.

12. The composition according to claim 11, wherein the quantity of coupling agent is between $5\times10^{-7}$ and $5\times10^{-6}$ moles per square meter of reinforcing white filler.

13. The composition according to claim 1, wherein the titanium oxide satisfies one or both of the following characteristics:

its BET surface area is within the range of 40 to 140 m$^2$/g;

its particle size $d_w$ is within the range of 50 to 150 nm.

14. The composition according to claim 1, wherein the titanium oxide satisfies all the following characteristics:

its BET surface area is within the range of 40 to 140 m$^2$/g;

its particle size $d_w$ is within the range of 50 to 150 nm; and its disagglomeration rate α is greater than $5\times10^{-2}$ μm$^{-1}$/s.

15. The composition according to claim 1, wherein the coupling agent is a polysulphurized alkoxysilane.

16. The composition according to claim 1, wherein the diene elastomer is selected from the group consisting of polybutadienes, polyisoprenes, natural rubber, butadiene-styrene copolymers, butadiene-isoprene copolymers, butadiene-acrylonitrile copolymers, isoprene-styrene copolymers, butadiene-styrene-isoprene copolymers, and mixtures thereof.

17. The composition according to claim 16, wherein the diene elastomer is a butadiene-styrene copolymer prepared in solution having a styrene content of between 20% and 30% by weight, a content of vinyl bonds of the butadiene part of between 15% and 65%, a content of trans-1,4 bonds of between 20% and 75% and a glass transition temperature of between −20° C. and −55° C.

18. The composition according to claim 17, further comprising a polybutadiene having more than 90% cis-1,4 bonds.

19. The composition according to claim 1, wherein the diene elastomer is an EPDM copolymer.

20. A process for reinforcing a diene rubber composition usable for the manufacture of tires, comprising incorporating by mechanical kneading into the diene rubber composition in an uncured state a titanium oxide having the following characteristics:

(a) its specific BET surface area is between 20 and 200 m$^2$/g;

(b) its average particle size (by mass), $d_w$, is between 20 and 400 nm; and (c) its disagglomeration rate, α, measured by the ultrasound disagglomeration test, at 100% power of a 600-watt ultrasonic probe, is greater than $2\times10^{-2}$ μm$^{-1}$/s.

21. A rubber article comprising a composition according to claim 1.

22. A tire comprising a rubber composition according to claim 1.

23. A colored tire comprising a rubber composition according to claim 1.

24. A tread for a tire comprising a rubber composition according to claim 1.

25. A colored tread for a tire comprising a rubber composition according to claim 1.

* * * * *